United States Patent [19]

Shimizu et al.

[11] 4,267,993
[45] May 19, 1981

[54] ARRANGEMENT FOR MOUNTING SPEAKER UNIT TO VEHICLE PANEL

[75] Inventors: Kenzo Shimizu; Yoshio Matsuno, both of Yokosuka, Japan

[73] Assignee: Nissan Motor Company, Limited, Yokohama, Japan

[21] Appl. No.: 944,005

[22] Filed: Sep. 20, 1978

[30] Foreign Application Priority Data

Dec. 15, 1977 [JP] Japan .................. 52-169285[U]

[51] Int. Cl.³ .............................................. G12B 9/00
[52] U.S. Cl. ......................................... 248/27.1; 296/70
[58] Field of Search ................... 248/27.1, 316 D; 24/243 C, 256, 259 R; 296/70; 181/141, 171; 179/146 E, 1 E

[56] References Cited

U.S. PATENT DOCUMENTS

| | | | |
|---|---|---|---|
| 2,731,229 | 1/1956 | Seitz | 248/316 D |
| 3,531,072 | 9/1970 | Lindquist | 248/316 D X |
| 3,666,040 | 5/1972 | Junk | 248/27.1 X |
| 3,716,671 | 2/1973 | Karr | 248/27.1 X |
| 3,827,152 | 8/1974 | Dailey | 248/316 D X |
| 3,990,755 | 11/1976 | Krause | 248/316 D X |
| 4,005,761 | 2/1977 | Okamoto | 181/141 |
| 4,056,165 | 11/1977 | Okamoto et al. | 181/141 |

FOREIGN PATENT DOCUMENTS

| | | | |
|---|---|---|---|
| 1215456 | 4/1960 | France | 248/316 D |
| 1144346 | 3/1969 | United Kingdom | 248/316 D |
| 1410719 | 10/1975 | United Kingdom | 248/27.1 |

Primary Examiner—J. Franklin Foss

[57] ABSTRACT

A panel such as instrument panel or door panel of a vehicle is integrally formed with a speaker supporter. The supporter comprises flat base part which has at one end thereof a catch portion into which a part of the speaker unit is slidably inserted to be caught; and slant parts connecting the flat base part to the major part of the panel in such an arrangement that the flat base part is parallelly spaced away from the major part of the panel.

3 Claims, 9 Drawing Figures

ARRANGEMENT FOR MOUNTING SPEAKER UNIT TO VEHICLE PANEL

The present invention relates in general to an arrangement for mounting an apparatus to a panel and more particularly to an arrangement for mounting a speaker unit of radio receiver or the like to a panel of a vehicle.

It is an object of the present invention to provide an improved arrangement for mounting a speaker unit to a vehicle panel such as an instrument panel or a door panel.

It is another object of the present invention to provide such an arrangement by which mounting or dismounting of the speaker unit to or from the panel is considerably facilitated.

It is still another object of the present invention to provide such an arrangement by which the speaker unit is tightly mounted to the panel without using bolts and nuts.

It is a further object of the present invention to provide a speaker unit connector which is simple in construction and economical.

Other objects and advantages of the present invention will become apparent from the following description when taken in conjunction with the accompanying drawings, in which.

Prior to describing the arrangement of the invention, a conventional arrangement between a speaker unit and an instrument panel of a vehicle will be described with aid of FIGS. 1 to 3 in order to clarify the inventive steps of the invention.

Figure 1:
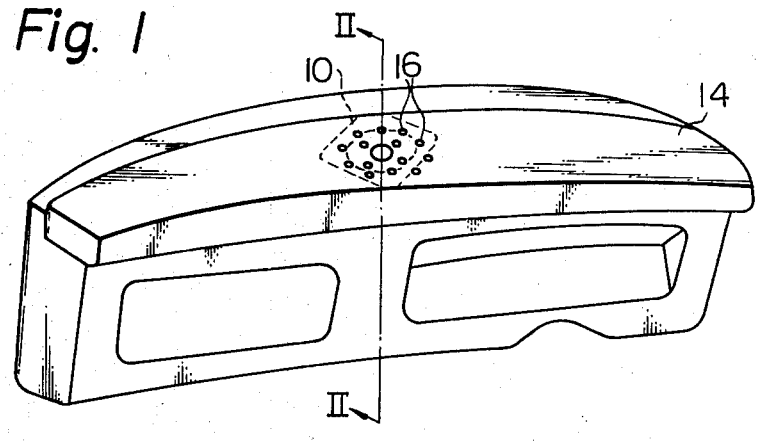
FIG. 1 is a perspective view of a dashboard of a vehicle, showing a section where a speaker unit is usually positioned.

In FIG. 1, a dashboard section of a vehicle is illustrated to show a section where a speaker unit 10 of a radio receiver or the like is usually positioned.

Figure 2:
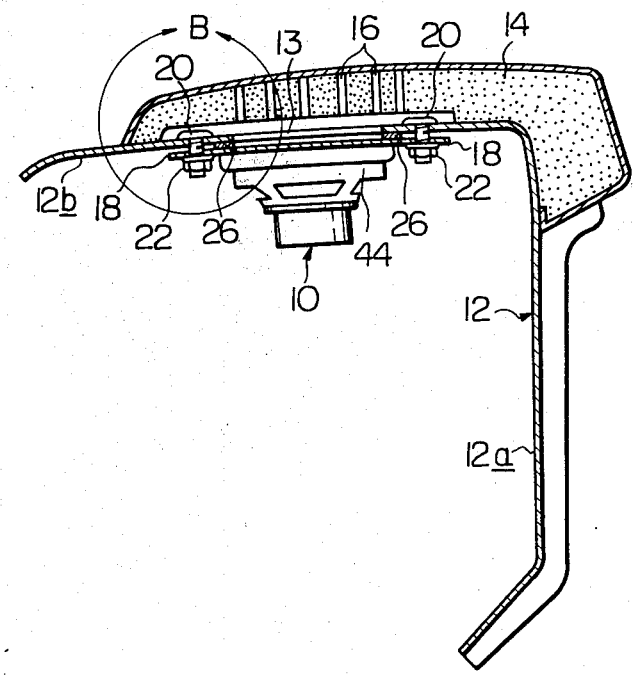
FIG. 2 is a sectional view taken along the line II—II of FIG. 1, and shows a conventional arrangement between a speaker unit and an instrument panel.
Figure 3:
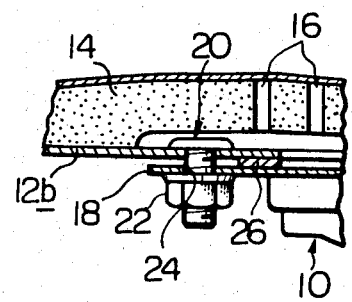
FIG. 3 is an enlarged view of a section encircled by a circle B of FIG. 2.

Referring now to FIGS. 2 and 3, there is illustrated a conventional arrangement between a speaker unit 10 and an instrument panel 12 of the dashboard. The instrument panel 12 now shown generally comprises a vertical section 12a facing a passenger compartment, and a horizontal section 12b supporting the speaker unit 10, the horizontal section being formed with an opening 13 through which sounds produced by the speaker unit 10 pass. The horizontal section 12b and an upper part of the vertical section 12a are covered by a pad member 14. The pad member 14 is formed at a portion facing the opening 13 with a plurality of through holes 16 through which the sounds from the opening 13 pass.

The connection of the speaker unit 10 to the horizontal portion 12b is made by using a speaker mounting annular plate 18, a plurality of bolts 20 and nuts 22 in such a manner as will be described hereinnext. The speaker mounting annular plate 18 is initially secured to the speaker unit 10 so as to define a peripheral section thereof (no numeral) which projects radially outwardly from the speaker unit 10. The peripheral section of the plate 18 is formed with a plurality of evenly spaced holes 24 (see FIG. 3) through which the bolts pass. Usually, the bolts 20 are welded at their heads to the horizontal section 12b, so that screwing the nuts 22 in the tightening direction performs the tight connection between the speaker unit 10 and the horizontal section 12b. Denoted by numeral 26 is an annular paperboard of shock absorber which is tightly disposed between the mounting plate 18 and the horizontal section 12b. Usually, the annular paperboard 26 is initially bonded to the mounting plate 18.

With the arrangement mentioned above, however, it will require very troublesome steps to mount and dismount the speaker unit 10 to and from the horizontal section 12b due to usage of bolts and nuts. In fact, such mounting and dismounting must be made by stretching the operator's hand or hands awkwardly under, up and around to the back side of the instrument panel 12 to screw the nuts 22. Obviously, this is very troublesome because the operator has to work blindly.

Accordingly, as has been mentioned, the present invention proposes to eliminate such drawbacks encountered in the conventional speaker mounting arrangement.

Referring to FIGS. 4 to 7, there is shown a first embodiment of the arrangement of the invention. For facilitation of drawings and description, substantially the same parts will be designated by the same numerals as in the case of FIG. 2, the detailed explanation of which will be omitted from the following.

Figure 6:
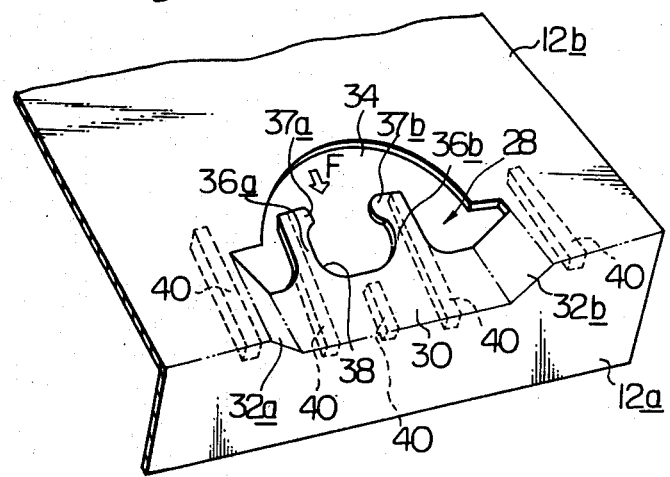
FIG. 6 is a perspective view of a main part of the instrument panel shown in FIG. 4.

In this first embodiment, a speaker supporter section 28 is provided by cutting and then displacing downwardly a portion of the horizontal section 12b which is located near the upper end of the vertical section 12a of the instrument panel 12. Preferably, such supporter section 28 is formed upon metal stamping procedure of the panel 12. Of course, such section may be provided by separate material. As will be seen from FIGS. 6 and 7, the speaker supporter section 28 generally comprises a flat base portion 30 which is parallelly spaced from the major portion of the horizontal section 12b, and two slant portions 32a and 32b each of which integrally connects one lateral end of the base portion 30 to the major portion of the horizontal section 12b. As is best seen in FIG. 6, the rear ends of both the flat base portion 30 and the two slant portions 32a and 32b are integral with the vertical section 12a, while the front ends of the same are separated from the major portion of the horizontal section 12b to define an opening 34 therebetween. The flat base porton 30 is integrally provided at the front portion thereof with two resilient tangs 36a and 36b which define a circular opening 38 into which a magnet case of the speaker unit 10 may be inserted to be caught in a manner as will be described hereinlater. Denoted by numerals 37a and 37b are latching abutments which are formed on their corresponding tangs 36a and 36b to face each other. A plurality of libs 40 are attached to the back surface of the horizontal section 12b for increasing the mechanical strength of the speaker supporter section 28.

Figure 5:
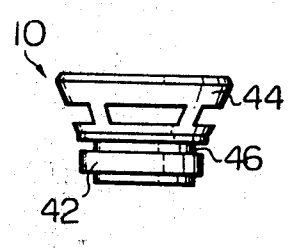
FIG. 5 is a view of a speaker unit to be used for the arrangement of the invention.

As is best seen from FIG. 5, the speaker unit 10 to be mounted to the speaker supporter section 28 generally comprises a magnet case 42 in which a permanent magnet is held, and a diaphragm housing 44 in which a diaphragm is received. The magnet case 42 is formed therearound with a groove 46 into which the before-mentioned tangs 36a and 36b more specifically the latching abutments 37a and 37b are tightly received.

Figure 4:
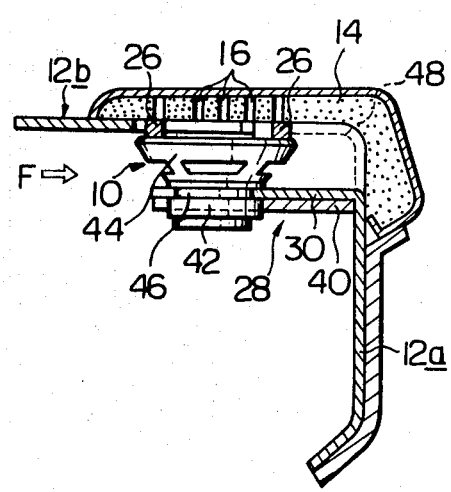
FIG. 4 is a view similar to FIG. 2, but shows a first embodiment of the arrangement of the invention.
Figure 7:
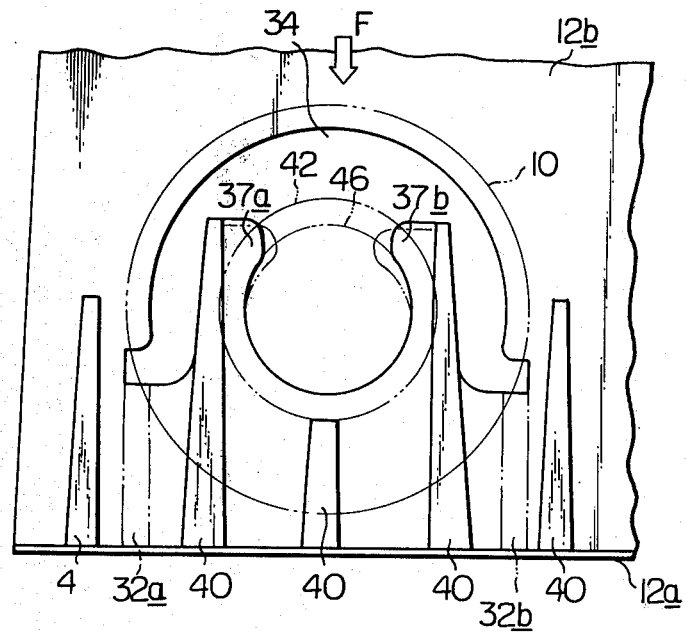
FIG. 7 is a view taken from the back side of FIG. 6.

In mounting the speaker unit 10 to the horizontal section 12b of the instrument panel 12, the speaker unit 10 is so oriented that the diaphragm thereof faces the horizontal section 12b and then the unit 10 is moved in the direction of arrow "F" as viewed in FIGS. 4, 6 and 7. This movement is guided by the two latching abutments 37a and 37b sliding in the groove 46 of the speaker unit 10. As the magnet case 42 moves along the latching abutments 37a and 37b, the tangs 36a and 36b are depressed in outward directions. After the magnet case 42 passes over the latching abutments 37a and 37b, the tangs 36a and 36b finally return towards their original generally undepressed disposition while tightly gripping the magnet case with the latching abutments 37a and 37b as shown in FIG. 7. Thus, the magnet case 42 and thus the speaker unit 10 are now tightly held and locked in place. Dismounting of the speaker unit 10 from the horizontal section 12b is a reversal of the above-mentioned procedure.

As is shown in FIG. 4, a suitable reinforcing member may be attached to the instrument panel 12 at the position indicated by a broken line 48, if desired, in order to prevent the pad member 14 from being depressed awkwardly there.

Figure 8:
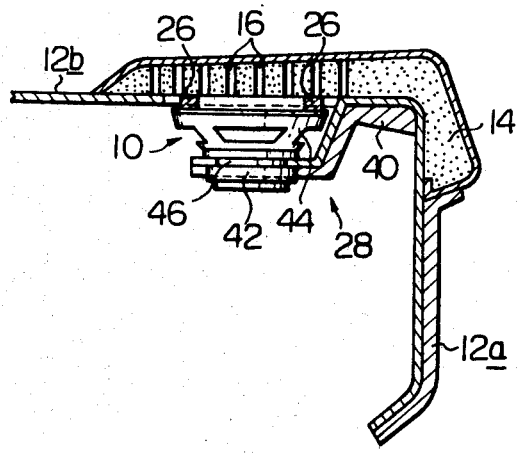
FIG. 8 is a view similar to FIG. 4, but shows a second embodiment of the arrangement of the present invention.

Referring to FIG. 8, there is shown a second embodiment of the arrangement of the invention. In this case, the speaker supporter section 28 is located apart from the upper end of the vertical section 12a of the instrument panel 12.

Figure 9:
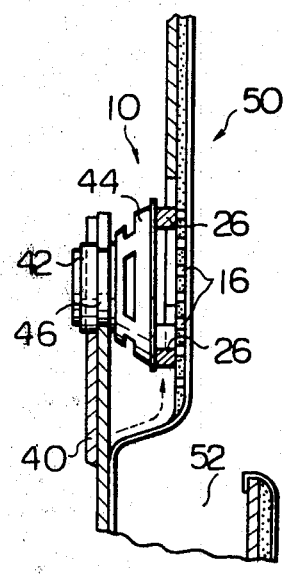
FIG. 9 is a sectional view of an arrangement between a speaker unit and a door panel of a vehicle, showing a third embodiment of the invention.

Referring to FIG. 9, there is shown a third embodiment of the arrangement, which is applied to a vehicle door panel 50. Designated by numeral 52 is a door pocket.

From the foregoing description, it will be appreciated that the arrangement according to the present invention facilitates mounting and dismounting the speaker unit to and from the instrument panel or the like and secures connection between the speaker unit and the panel.

What is claimed is

1. A vehicle comprising:

a panel which defines a portion of the body structure of said vehicle and is integrally formed with a speaker supporter section, said speaker supporter section including a first portion which is substantially flat and has at one end thereof a catch portion, and a second portion which integrally connects said first portion to the major portion of said panel in a manner that the first portion is parallelly spaced apart from the major portion, said catch portion including two resilient tangs which are respectively formed at the leading end portions thereof with latching abutments which extend toward each other; and a speaker unit having a magnet case which is formed around a groove, said speaker unit being held by said catch portion of said speaker supporter section by inserting said two resilient tangs into said groove of said magnet case; and reinforcing members which are fixed to said first and second portions to increase the mechanical strength of the same.

2. A vehicle as claimed in claim 1, in which said panel is an instrument panel which comprises a vertical section facing a passenger compartment and a horizontal section integrally connected at its one end to an upper end of said vertical section, and in which said speaker supporter section is positioned downwardly from said horizontal section.

3. A vehicle as claimed in claim 1, in which said panel is a vertically extending door panel.

* * * * *